United States Patent
Fu et al.

(10) Patent No.: US 11,591,021 B2
(45) Date of Patent: Feb. 28, 2023

(54) METHOD FOR PREPARING AND/OR PERFORMING A STEERING INTERVENTION THAT ASSISTS THE DRIVER OF A VEHICLE

(71) Applicant: Robert Bosch GmbH, Stuttgart (DE)

(72) Inventors: Chengxuan Fu, Ditzingen (DE); Oezguer Sen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 17/285,284

(22) PCT Filed: Nov. 8, 2019

(86) PCT No.: PCT/EP2019/080712
§ 371 (c)(1),
(2) Date: Apr. 14, 2021

(87) PCT Pub. No.: WO2020/120043
PCT Pub. Date: Jun. 18, 2020

(65) Prior Publication Data
US 2021/0387671 A1 Dec. 16, 2021

(30) Foreign Application Priority Data
Dec. 14, 2018 (DE) .......................... 102018221780.7

(51) Int. Cl.
*B62D 15/02* (2006.01)
(52) U.S. Cl.
CPC ................. *B62D 15/0265* (2013.01)
(58) Field of Classification Search
CPC ............. B62D 15/025; B62D 15/0265; B62D 15/021; B62D 5/0463; B62D 6/003; B62D 6/04; B62D 6/08
See application file for complete search history.

(56) References Cited

U.S. PATENT DOCUMENTS

| 8,983,724 B2 * | 3/2015 | Hauler | B62D 15/0265 701/41 |
| 2009/0192710 A1 * | 7/2009 | Eidehall | B60W 50/0097 701/300 |

(Continued)

FOREIGN PATENT DOCUMENTS

| DE | 102005036219 A1 | 2/2007 |
| DE | 102014220865 A1 | 4/2016 |
| EP | 3002178 A1 | 4/2016 |

OTHER PUBLICATIONS

International Search Report for PCT/EP2019/080712, dated Jan. 31, 2020.

*Primary Examiner* — Redhwan K Mawari
(74) *Attorney, Agent, or Firm* — Norton Rose Fulbright US LLP; Gerard Messina

(57) ABSTRACT

A method for preparing and/or performing a steering intervention. The method includes detecting a traffic-influencing object and continuously recording object information, determining whether the object is tangential to a current trajectory of the vehicle, monitoring a lateral distance to the object or a predicted time available until a countersteering intervention is necessary before the object is reached. The method additionally includes checking whether the driver performs a countersteering intervention, for the case that the lateral distance or the available time falls below a first threshold value, of pilot controlling at least one actuator that influences the trajectory, so that a steering pretorque is applied if no steering intervention is performed by the driver, and triggering the steering actuator, so that a steering torque is applied to the steering, if the lateral distance or the available time additionally falls below a second threshold value.

10 Claims, 4 Drawing Sheets

(56) References Cited

U.S. PATENT DOCUMENTS

| | | | |
|---|---|---|---|
| 2011/0035106 A1* | 2/2011 | Hauler | B62D 15/025 |
| | | | 701/1 |
| 2011/0196576 A1* | 8/2011 | Stahlin | B62D 15/025 |
| | | | 701/41 |
| 2015/0224988 A1 | 8/2015 | Buerkle et al. | |
| 2016/0096546 A1* | 4/2016 | Chia | B62D 15/025 |
| | | | 701/41 |
| 2017/0101131 A1* | 4/2017 | Zegelaar | B62D 6/10 |
| 2018/0170430 A1* | 6/2018 | Shimizu | B62D 15/021 |
| 2018/0286566 A1* | 10/2018 | Aoki | H01F 27/2804 |

* cited by examiner

METHOD FOR PREPARING AND/OR PERFORMING A STEERING INTERVENTION THAT ASSISTS THE DRIVER OF A VEHICLE

FIELD

The present invention relates to a method for preparing and/or performing a steering intervention that assists the driver of a vehicle and a device for implementing the method.

BACKGROUND INFORMATION

LSS (lane support system) functions are components of Euro NCAP 2018. These functions ensure an enhanced driving safety with regard to lateral guidance of the vehicle. An example thereof is the emergency lane keeping oncoming function, which intervenes in the case of unintentional lane departure toward the adjacent lane if an approaching vehicle is detected thereon.

A driver assistance system is described in German Patent Application No. DE 10 2005 036 219 A1. Here, a lane departure monitoring device triggers a haptic warning in the form of a steering-wheel vibration to assist the driver of a motor vehicle in the case of an involuntary departure from a specified lane in the event the vehicle makes contact with or approaches the boundary of the own lane thereof, and, as a driver-assisting reaction, triggers an automatic countersteering back to the middle of the lane, always simultaneously with this warning.

It is important, on the one hand, that the LSS functions respond as early as possible to enable a dangerous situation to be avoided since the entire system, in particular the actuators, are not able to respond infinitely quickly. On the other hand, it is also important, however, that the LSS functions be triggered at the latest possible time so that the driver is not unnecessarily disturbed if he/she had reacted in time.

It is an object of the present invention to provide a method which will make it possible for a steering intervention, which assists the driver of a vehicle, to be performed late.

SUMMARY

The objective may be achieved by a method for preparing and/or performing a steering intervention, which assists the driver of a vehicle, in accordance with an example embodiment of the present invention. The present invention also provides a device for implementing the example method according to the present invention. Advantageous refinements of the present invention are described herein.

The method according to an example embodiment of the present invention relates to preparing and/or performing a steering intervention, which assists the driver of a vehicle. The method thereby includes the steps of detecting a traffic-influencing object and of continuously recording object information, of determining, on the basis of object information, whether the object is tangential to a current trajectory of the vehicle, of monitoring a lateral distance to the object or a predicted time available until a countersteering intervention is necessary before the object is reached in the case that the object is tangential to the current trajectory of the vehicle.

The method additionally includes the steps of checking whether the driver performs a countersteering intervention, for the case that the lateral distance or the available time falls below a first threshold value, of pilot controlling at least one actuator that influences the trajectory, so that a steering pretorque is applied, which makes it difficult to further reduce the lateral distance or the available time if no steering intervention is performed by the driver, and of triggering the at least one actuator, so that a steering torque is applied which increases the lateral distance or the available time in the case that the lateral distance or the available time additionally falls below a second threshold value.

A current path or a path of movement of a vehicle is understood to be a trajectory. The trajectory thereby has a predefined lateral width which preferably corresponds to the width of the vehicle. In addition, a safety distance may also be introduced into the width of the trajectory. The trajectory thereby depends, for example, on a current driving direction of the vehicle as well as on a steering angle. Along the lines of the present invention, a traffic-influencing object is understood to be an object which lies in the trajectory of the vehicle or is tangential thereto or may influence it. Object information on this traffic-influencing object is determined, which, in principle, makes possible an assertion about the object and a direction of movement thereof. Accordingly, the object information may be used to ascertain whether the object is tangential to the trajectory.

In the context of the present invention, lateral distance is thereby understood to be the distance to the object extending transversely to the vehicle. This distance is thereby additionally dependent on the trajectory and is determined orthogonally to the trajectory. The predicted time available until a countersteering intervention is necessary is thereby the time remaining until a steering intervention must take place at the latest to still reliably prevent a meeting of the vehicle and the object. This time is thereby dependent on various object information.

An actuator that influences the trajectory is understood to be any actuator that is able to modify the driving direction of the vehicle by a triggering. It may be a steering actuator, an ESP actuator, an actuator of a torque vectoring system and/or an actuator of an active suspension system, for example. Thus, actuators of different systems may also be used at the same time in order to influence the trajectory.

The present invention has the advantage that pilot controlling the at least one actuator, which influences the trajectory, biases the same. The time for biasing the actuator thereby takes place in a still non-critical phase. This time is saved in the critical phase. Moreover, biasing in the critical phase makes it possible for the actuator to respond with a minimum latency. Thus, the time until a reaction of the steering intervention assisting the driver may thereby be further reduced, making it possible for the steering intervention to be performed very late. Thus, a late response of the driver may still be awaited before a pronounced/substantial steering intervention is performed.

Detected as a traffic-influencing object in a preferred embodiment of the present invention are/is a lateral lane marking, an oncoming foreign vehicle, a passing foreign vehicle and/or a road edge. The foreign vehicle may thereby be a motor vehicle, as well as a bicyclist. This makes it possible for the essential objects that influence the trajectory to be detected.

Another preferred example embodiment of the present invention provides that the available time be determined as a function of a relative velocity to the object. The relative velocity is thereby an essential value used in predicting an available time until a countersteering intervention is necessary before the object is reached. This makes possible a more precise assertion regarding the critical situation, making it possible for the steering intervention to be performed late.

A torque of 0.5 to 3 Nm is preferably applied as the steering pretorque. It is especially preferred that a steering pretorque of 1 to 2 Nm be applied. Thus, a sufficient torque may be applied in order to pilot control the at least one actuator. Moreover, this torque is small enough to generally not be perceived as disturbing by the driver, allowing him/her to continue to completely steer the vehicle.

The object of the present invention may also be achieved by a device that is adapted for implementing the method according to an example embodiment of the present invention. The device thereby includes a detection means (i.e., a detector) for detecting a traffic-influencing object and for continuously recording object information, an analysis means (i.e., an analysis element) for determining whether the object is tangential to a current trajectory of the vehicle and for monitoring whether a lateral distance to the object or a predicted time available until a countersteering intervention is necessary before the object is reached falls below a threshold value, and a control means (i.e., a controller) for pilot controlling at least one actuator, so that a steering pretorque may be applied, and for triggering the at least one actuator, so that a steering torque may be applied.

A detection means is thereby understood to be any means which may be used to detect a traffic-influencing object and via which information on the object may be measured. The analysis means may thereby be a means which, on the basis of the object information, computes values and estimates to what extent the current driving situation is critical. The analysis means may thereby access a database in which various values are stored. In the same way, the analysis means may thereby access a trained neural network or also other classifier weights.

When such a device is used, the advantages mentioned for the method may be achieved.

The actuator is preferably a steering actuator, an ESP actuator, an actuator of a torque vectoring system and/or an actuator of an active suspension system. Such actuators are able to influence the trajectory of the vehicle and thus apply a steering pretorque, respectively a steering torque. The steering actuator is thereby an actuator which acts directly on the steering of the vehicle. These actuators may also act in combination with one another.

In an advantageous embodiment, the detection means is in the form of a sensor unit. The sensor unit thereby preferably includes a plurality of sensors which make it possible to detect the traffic-influencing object.

The sensor unit preferably includes a camera, a radar and/or a lidar. The advantage of a camera is that it makes it possible for the traffic-influencing object to be readily identified on the basis of the image information. Moreover, the camera makes it possible to efficiently detect the generally two-dimensional lateral lane marking. On the other hand, radar and lidar have the advantage of having a long transmission range, so that a traffic-influencing object may already be detected at a great distance. Moreover, these systems make it possible to better estimate distances and velocities. The systems are advantageously used together in a vehicle to combine the advantages of the various techniques.

The objective may additionally be achieved by a vehicle which includes a device for implementing the method according to an example embodiment of the present invention. Such a vehicle makes it possible to achieve the advantages mentioned for the method and the device.

Moreover, the present invention includes a computer program product.

Exemplary embodiments of the present invention are illustrated in the figures and explained in greater detail below.

DETAILED DESCRIPTION OF EXAMPLE EMBODIMENTS

Figure 1:
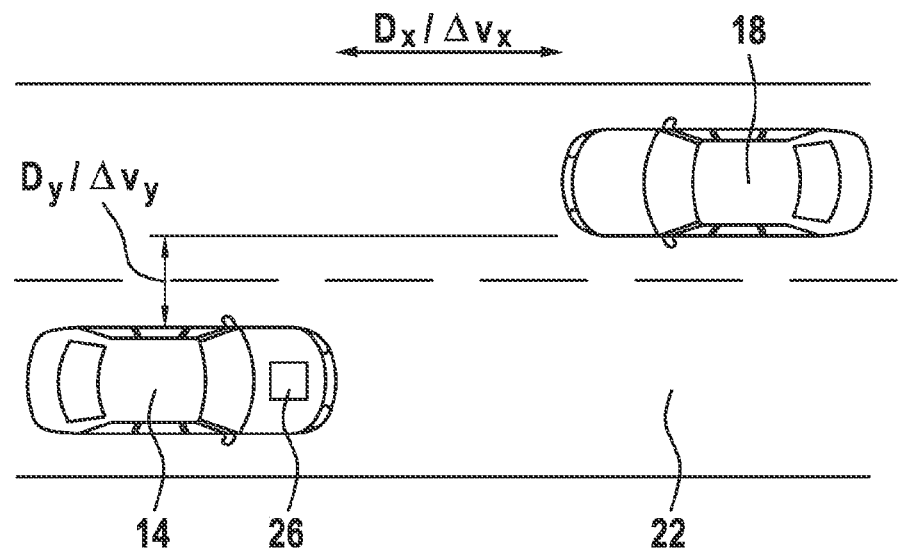
FIG. 1 shows a first example where the method according to an example embodiment of the present invention may be implemented.

FIG. 1 shows a first example where method 10 according to the present invention (see FIG. 4) may be implemented. In this example, a traffic-influencing object 18 approaches a driver of a vehicle 14. Traffic-influencing object 18 in this example is a foreign vehicle approaching in an opposite lane 22. In the exemplary embodiment, vehicle 14 has a detection means 26 configured in the form of a sensor unit. Sensor unit 26 is able to measure object information, such as, for example, a lateral distance Dy and a longitudinal distance Dx between vehicle 14 and foreign vehicle 18, a longitudinal relative velocity Δvx and a lateral relative velocity Δvy between vehicle 14 and foreign vehicle 18.

Figure 2:
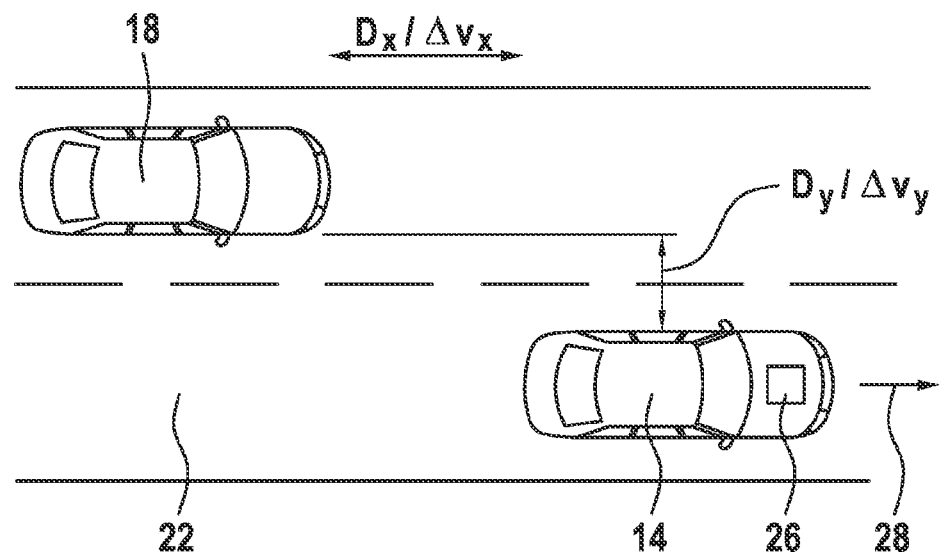
FIG. 2 shows a second example where the method according to an example embodiment of the present invention may be implemented.

FIG. 2 shows a second example where method 10 according to the present invention may be implemented. Traffic-influencing object 18 in this example is a passing foreign vehicle. With regard to this foreign vehicle 18, the same reference numerals are used that are already mentioned with reference to FIG. 1. In FIG. 2, foreign vehicle 18 is passing in opposite lane 22. Although, in this example, foreign vehicle 18 is passing vehicle 14 in a lane 22 located on the left in a travel direction 28 of vehicle 14, passing in a right lane 22 is likewise possible to implement method 10 in accordance with the present invention.

Figure 3:
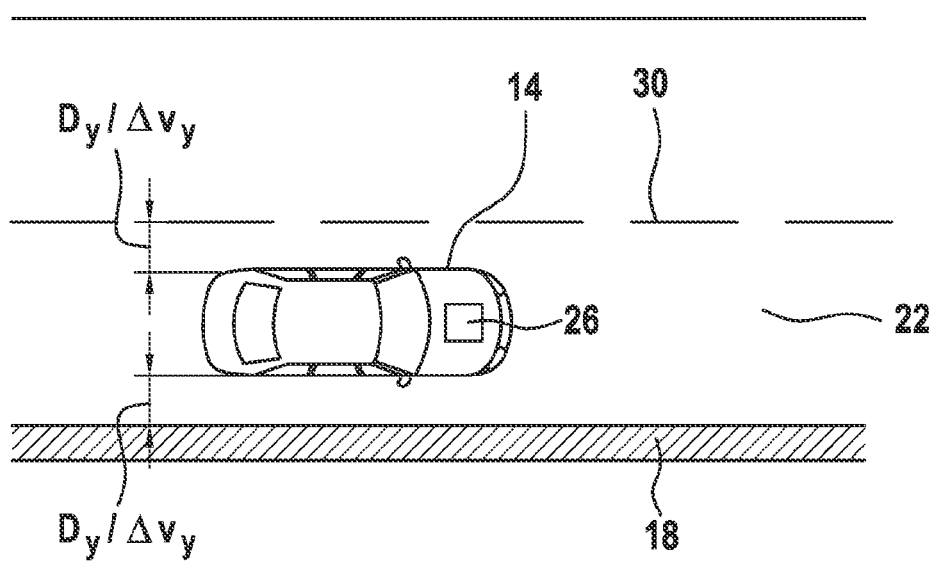
FIG. 3 shows a third example where the method according to an example embodiment of the present invention may be implemented.

FIG. 3 shows a third example where method 10 according to the present invention may be implemented. In this example, traffic-influencing object 18 is a road edge. Accordingly, lateral distance Dy and lateral relative velocity Avy to road edge 18 are measured via sensor unit 26. FIG. 3 shows that traffic-influencing object 18 may likewise be a lane marking 30. Thus, lateral distance Dy and lateral relative velocity Avy to this lane marking 30 may likewise be measured.

Figure 4:
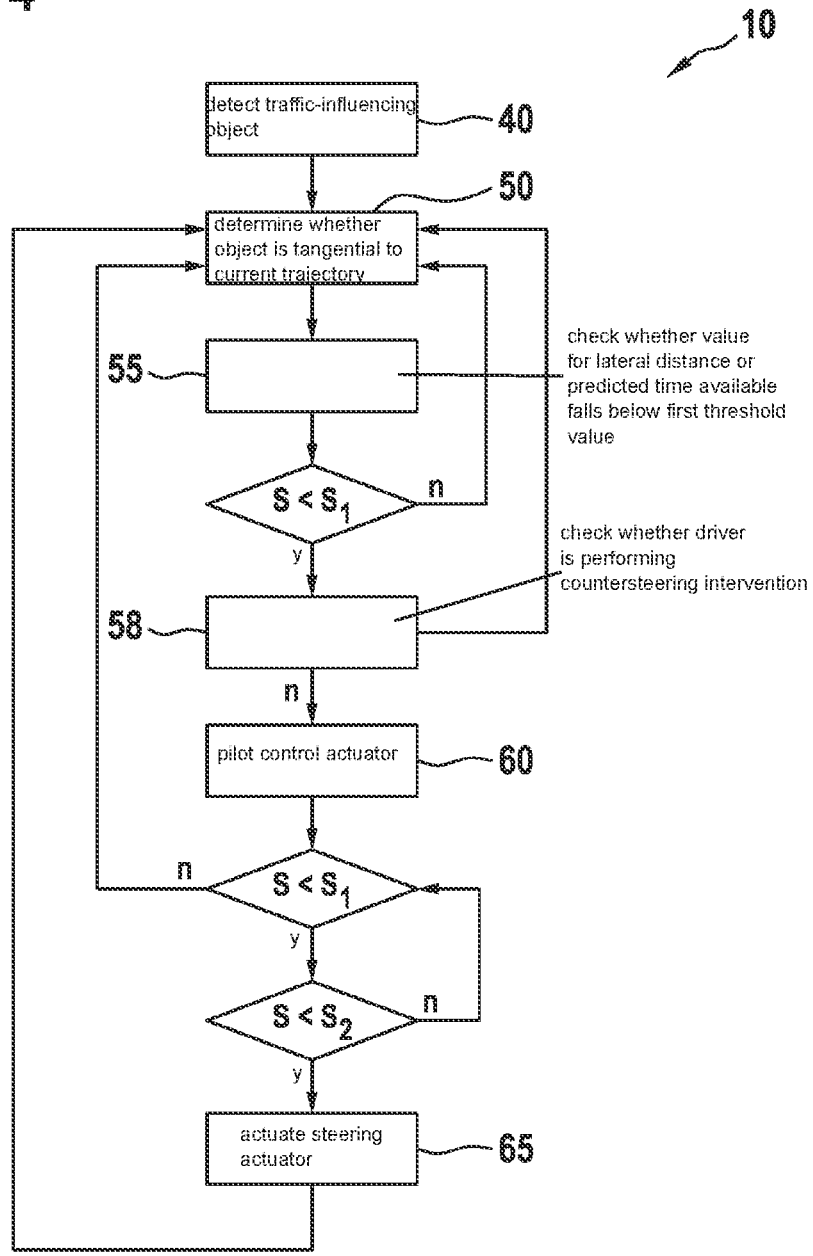
FIG. 4 shows a method according to an example embodiment of the present invention for preparing and/or performing a steering intervention that assists the driver of a vehicle.

FIG. 4 shows method 10 according to the present invention for preparing and/or performing a steering intervention that assists the driver of vehicle 14. Traffic-influencing object 18 is detected in a first step 40. This means that traffic-influencing object 18 arrives in a measuring range of sensor unit 26. Additionally, from this point in time on, the object information is continuously recorded in first step 40. In addition, from this object information, the classification is made as to the sort of traffic-influencing object 18 that is concerned. This means that the determination is made whether object 18 is, for example, an oncoming foreign vehicle or a road edge.

In a second step 50, the determination is made, on the basis of object information, whether object 18 is tangential to a current trajectory of vehicle 14. It is thus checked whether the trajectory of vehicle 14 resulting from current travel direction 28 could meet traffic-influencing object 18.

If such a meeting is ascertained, a third step 55 monitors lateral distance Dy to object 18 or a predicted time available until a countersteering intervention is necessary before object 18 is reached. Following third step 55, it is checked whether a value S for lateral distance Dy to object 18 or the predicted time available falls below a first threshold value $S_1$. First threshold value $S_1$ is thereby a value S at which lateral distance Dy or the available time is not yet critical.

If value S for the lateral distance or the predicted time available is above threshold value $S_1$, second step 50 is restarted. If value S for the lateral distance or the predicted time available has been reduced to below threshold value $S_1$, a fourth step 58 checks whether the driver is performing a countersteering intervention. If the driver of vehicle 14 performs such a steering intervention, second step 50 is restarted, and it is thus checked whether the trajectory of vehicle 14 is still tangential to object 18. If no driver activity is ascertainable, for example, by registering a countersteering intervention, a fifth step 60 is performed.

An actuator, which influences the trajectory of vehicle 14, is pilot controlled in this fifth step 60. In the exemplary embodiment shown here, the actuator is a steering actuator. The steering actuator is thereby pilot controlled in such a way that a pretorque is applied to the steering of vehicle 14, which makes it difficult to further reduce lateral distance Dy or the available time. Pilot controlling the steering actuator already biases the same. Following application of the pretorque, vehicle 14 remains completely steerable. However, in the case of a steering movement in the direction of object 18, however, a hardening of the steering would be noticeable. Following fifth step 60, it is checked whether value S for lateral distance Dy or the predicted time available falls below first threshold value $S_1$. Should value S be above first threshold value $S_1$, it is again determined, on the basis of object information, in second step 50 whether it continues to be tangential to a current trajectory of vehicle 14.

If, following the pilot control, value S continues to be below first threshold value $S_1$, it is also checked whether value S is additionally below a second threshold value $S_2$. Second threshold value $S_2$ should thereby be a value S for lateral distance Dy or the time available at which a necessary steering intervention must be performed in order to still countersteer vehicle 14 safely before object 18 is reached.

Should value S fall below second threshold value $S_2$, the steering actuator is actuated in a sixth step 65 in such a way that a steering torque is applied to the steering, increasing lateral distance Dy or the available time. This means that the steering actuator generates a steering angle in which vehicle 14 is steered in a lateral direction opposite to object 18. The steering actuator, which is already biased before sixth step 65, is able to apply the steering torque in a short time, making it possible to reduce the time for taking action by a steering intervention. Following sixth step 65, it is again determined, on the basis of object information, in second step 50 whether object 18 is tangential to the current trajectory of vehicle 14.

Figure 5:
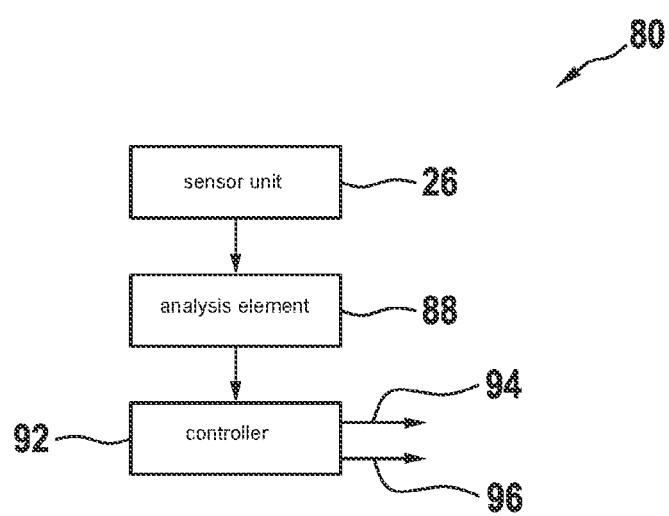
FIG. 5 shows a device for implementing the method according to an example embodiment of the present invention.

FIG. 5 illustrates a device 80 for implementing method 10 of the present invention. Device 80 thereby includes detection means 26 for detecting traffic-influencing object 18 and for continuously recording the object information. In this exemplary embodiment, detection means 26 is in the form of a sensor unit which combines radar, camera and lidar. This sensor unit 26 thereby measures lateral and longitudinal distances Dy, Dx, lateral and longitudinal relative velocities Δvy, Δvx and image information.

The object information is then transmitted to an analysis means 88 of device 80. On the basis of this object information, analysis means 88 determines whether object 18 is tangential to a current trajectory of vehicle 14. In addition, analysis means 88 monitors whether lateral distance Dy to object 18, or a predicted time available until a countersteering intervention is necessary before object 18 is reached, falls below first and/or second threshold value $S_1$, $S_2$.

In response to an undershooting of first and/or second threshold value $S_1$, $S_2$, the analysis means 88 transmits a signal indicative thereof to a control means 92 of device 80 for the pilot controlling or triggering of the actuator. In response to the signal from analysis means 88, control means 92 thereby transmits a pilot control signal 94 or a trigger signal 96 to the steering actuator (not shown), so that a pretorque or a steering torque may be applied to the steering.

What is claimed is:

1. A method for preparing and/or performing a steering intervention that assists a driver of a vehicle, the method comprising the following steps:
   detecting a traffic-influencing object and continuously recording object information;
   determining, based on the object information, whether the object is tangential to a current trajectory of the vehicle;
   based on determining that the object is tangential to the current trajectory of the vehicle, monitoring a predicted time available until a countersteering intervention is necessary before the object is reached;
   based on the available time falling below a first threshold value, checking whether the driver performs a countersteering intervention;
   based on determining that no steering intervention is performed by the driver, pilot controlling at least one actuator that influences the trajectory, so that a steering pretorque is applied, which makes it difficult to reduce a lateral distance to the object; and
   based on the available time additionally falling below a second threshold value, triggering the at least one actuator, so that a steering torque is applied which increases the lateral distance.

2. The method as recited in claim 1, wherein a lateral lane marking, and/or an oncoming foreign vehicle, and/or a passing foreign vehicle, and/or a road edge, is detected as a traffic-influencing object.

3. The method as recited in claim 1, wherein the available time is determined as a function of a relative velocity to the object.

4. The method as recited in claim 1, wherein a torque of 0.5 to 3 Nm is applied as the steering pretorque.

5. A device configured to for preparing and/or performing a steering intervention that assists a driver of a vehicle, comprising:
   a detector configured to detect a traffic-influencing object and to continuously recording object information; and
   a controller configured to:
      based on an available time, until a countersteering intervention is necessary before the object is reached, falling below a first threshold value, and no steering intervention being performed by the driver, pilot controlling at least one actuator that influences the trajectory, so that a steering pretorque is applied, which makes it difficult to reduce a lateral distance to the object; and based on the available time additionally falling below a second threshold value, triggering the at least one actuator, so that a steering torque is applied which increases the lateral distance.

6. The device as recited in claim 5, wherein the actuator is a steering actuator, and or an ESP actuator, and/or an actuator of a torque vectoring system and/or an actuator of an active suspension system.

7. The device as recited in claim 5, wherein the detector is a sensor unit.

8. The device as recited in claim 7, wherein the sensor unit includes a camera, and/or a radar device and/or a lidar device.

9. A vehicle, comprising:
a device configured to for preparing and/or performing a steering intervention that assists a driver of the vehicle, including:
  a detector configured to detect a traffic-influencing object and to continuously recording object information;
  and
  a controller configured to:
    based on an available time, until a countersteering intervention is necessary before the object is reached, falling below a first threshold value, and no steering intervention being performed by the driver, pilot controlling at least one actuator that influences the trajectory, so that a steering pretorque is applied, which makes it difficult to reduce a lateral distance to the object; and
    based on the available time additionally falling below a second threshold value, triggering the at least one actuator, so that a steering torque is applied which increases the lateral distance.

10. A non-transitory machine-readable storage medium on which is stored a computer program including program code for preparing and/or performing a steering intervention that assists a driver of a vehicle, the program code, when executed by computer, causing the computer to perform the following steps:
  detecting a traffic-influencing object and continuously recording object information;
  determining, based on the object information, whether the object is tangential to a current trajectory of the vehicle;
  based on determining that the object is tangential to the current trajectory of the vehicle, monitoring a predicted time available until a countersteering intervention is necessary before the object is reached;
  based on the available time falling below a first threshold value, checking whether the driver performs a countersteering intervention;
  based on determining that no steering intervention is performed by the driver, pilot controlling at least one actuator that influences the trajectory, so that a steering pretorque is applied, which makes it difficult to reduce a lateral distance to the object; and
  based on the available time additionally falling below a second threshold value, triggering the at least one actuator, so that a steering torque is applied which increases the lateral distance.

* * * * *